March 10, 1959 H. W. SIMPSON Re. 24,619

PLANETARY TRANSMISSION FOR SELF-PROPELLED VEHICLE

Original Filed Dec. 15, 1951 2 Sheets-Sheet 1

INVENTOR.
Howard W. Simpson.

PLANETARY TRANSMISSION FOR SELF-PROPELLED VEHICLE

Original Filed Dec. 15, 1951 2 Sheets-Sheet 2

INVENTOR.
Howard W. Simpson

United States Patent Office

Re. 24,619
Reissued Mar. 10, 1959

24,619

PLANETARY TRANSMISSION FOR SELF-PROPELLED VEHICLE

Howard W. Simpson, Dearborn, Mich., assignor of one-third to General Motors Corporation, Detroit, Mich., a corporation of Delaware Original No. 2,749,777, dated June 12, 1956, Serial No. 261,820, December 15, 1951. Application for reissue January 2, 1958, Serial No. 706,885

22 Claims. (Cl. 74—761)

Matter enclosed in heavy brackets [ ] appears in the original patent but forms no part of this reissue specification; matter printed in italics indicates the additions made by reissue.

This invention relates to a three speed and reverse planetary transmission with hydraulic controls and coupled to a hydrodynamic device of either the fluid coupling or torque converter type.

Planetary transmissions are usually costly and complicated and have other unfavorable characteristics such as gear noise, large power losses and overheating. Among the causes are high tooth loads, high tooth engagement speeds of either working or idling gears or both, little or no planetation, high clutch plate differential speeds, unbalanced radial or thrust loads, high bearing pressure, use of gear trains which do not permit efficient tooth action, and transfer of radial brake loads to rotating members instead of the loads passing directly from the brake drums to the transmission housing.

My transmission comprises only two simple planetary sets, two clutches, and two brakes and a third brake as an optional feature. One gear set is clutched to the input to obtain low speed and the other gear set is clutched to the input to obtain second speed, while both sets of gears are coupled to the input to operate in differential relationship to obtain reverse speed and both clutches are engaged to obtain high or direct drive.

In reverse the same clutch is used as in low speed but a different reaction member is braked. In low and second speeds the same brake is applied and holds a reaction member of both gear sets stationary.

To facilitate smooth pick up shifts between second and third speeds and vice versa, a one way or overrunning clutch is introduced between the reaction member and a brake. This permits the brake to remain engaged in direct drive and thus functions automatically to put the transmission into second speed the instant the high speed clutch is released when down shifting and to hold the transmission in second until the high speed clutch is engaged when up shifting.

One embodiment of my invention shows a fluid torque converter between the source of power and the planetary unit, the converter transmitting the full input torque to the gears in all speeds. An alternative embodiment shown has a fluid coupling which transmits the entire input torque in low and reverse speeds but none in second speed. In direct drive the coupling is subjected to only a fraction of the input torque. This reduces fluid slippage loss but retains the smoothness of a fluid drive. The gear trains shown have both gear sets alike with respect to the number of teeth and a wide range of ratios is obtainable by varying the number of teeth.

An object of my invention is to obtain a simple and efficient planetary with low tooth engagement speeds and loads, and low relative speeds of adjacent clutch members.

Another object is to obtain maximum planetary action in forward reduction speeds to reduce power loss.

Another object is to provide a simple planetary in which the brake loads are readily supported directly on the transmission housing without use of a partition or mid-support structure.

Another object is to reduce power loss in direct drive by partial lock up of the hydrodynamic device.

Another object is to provide a transmission in which smooth shifts from one forward speed to another are obtained while under continuous power.

These and other objects will become apparent from the following description together with accompanying simplified drawings which are partial elevations in section of several embodiments of my invention each employing two axially aligned planetary sets.

DESCRIPTION FIG. 1

Figure 1:
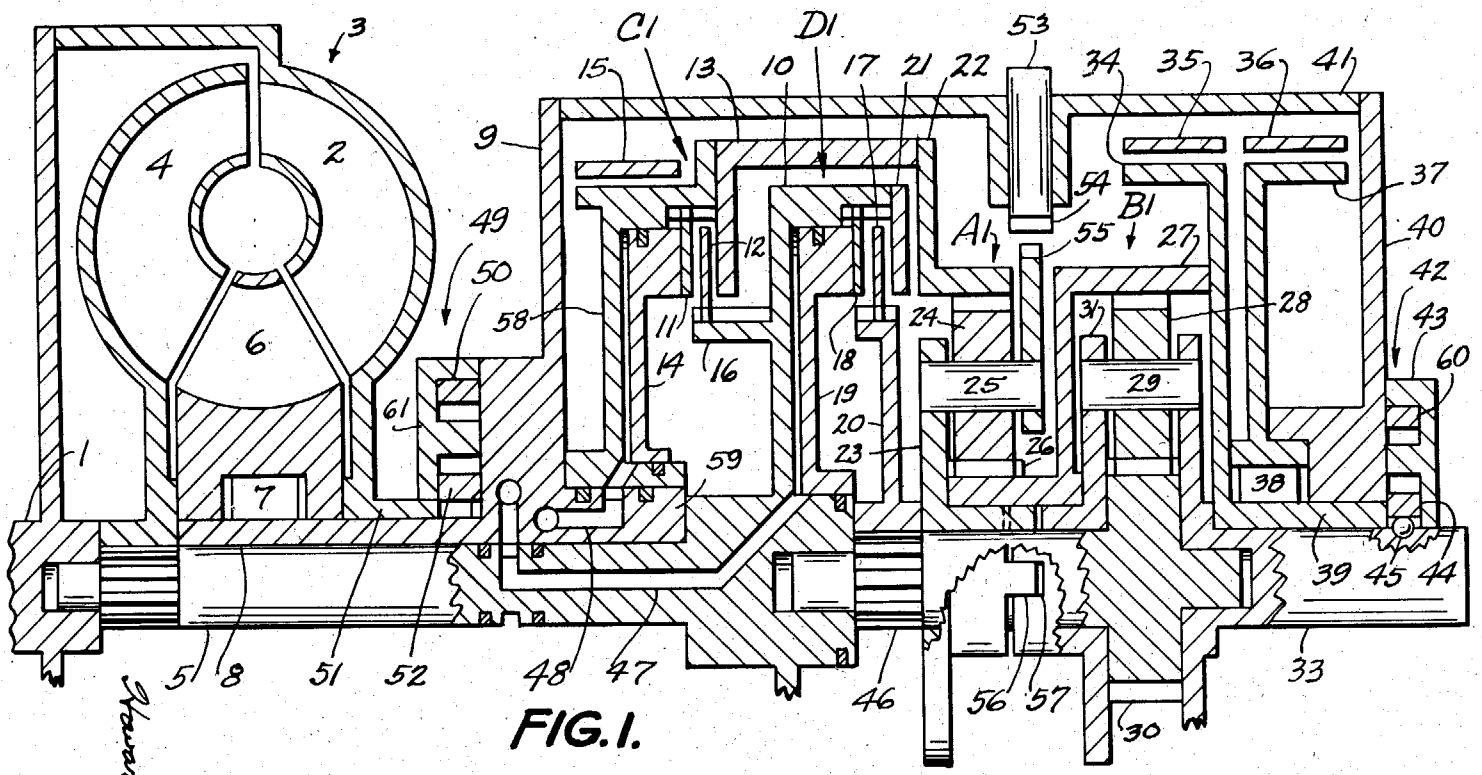
Fig. 1 shows a fluid torque converter combined with the planetary gears.

In Fig. 1 engine shaft 1 drives pump 2 of torque converter 3. Turbine 4 is splined to input shaft 5 which is integral with housing 10 of clutch D1. Reactor 6 is journaled on hub 8 of housing member 9. One way clutch 7 is biased between hub 8 and reactor 6 to permit only forward rotation of reactor 7. Clutch D1 includes housing 10, piston 19, discs 17 and 18 and pressure plate 21. Clutch C1 consists of housing 58 journaled on hub 59 of housing member 9, piston 14, discs 11 and 12 and pressure plate 13 which is attached to ring gear 22.

Brake band 15 can be applied to the outside of housing 58 to hold ring gear 22 stationary and is actuated by hydraulic means not shown. Clutch C1 is driven by disc 12 splined to hub 16 of housing 10. Clutch D1 drives drum 20 and intermediate shaft 46 to which it is splined. Intermediate shaft 46 is piloted in input shaft 5 and output shaft 33.

Gear set A1 consists of ring gear 22, sun gear 26 and several planet gears 24, one of which is shown journaled on pin 25 supported in carrier 23. Flange 55 is attached to carrier 23 which in turn is connected to carrier 31 by tongue 56 in groove 57. Carrier 31 is attached to output shaft 33 by pins 29, one of which is shown supporting planet gear 28 which is one of several meshing with sun gear 30 and ring gear 27 of gear set B1. Sun gear 26 is integral with ring gear 27 which is attached to brake drum 34 which has its hub 39 journaled in housing member 40. Brake drum 37 is also journaled in hub 39 and free wheeler 38 is biased between hub 39 and brake drum 37 to permit only forward rotation of hub 39 when brake band 36 only is applied.

Brake bands 35 and 36 can be applied to brake drums 34 and 37 respectively by hydraulic means not shown. Parking brake detent 53 has teeth 54 which are engageable with teeth on the outside diameter of flange 55. Oil pump 49 includes housing 61, gear 52 driven from hub 51 of pump 2. Gear 52 meshes with gear 50. Pump 49 supplies oil under pressure for operating the transmission when output shaft 33 is stationary and pump 42 supplies oil under pressure when output shaft 33 is rotating.

Pump 42 includes gears 60 and 44 the latter being driven from output shaft 33 by key 45, and pump housing 43. Oil under pressure for clutch C1 enters through suitable ducts and grooves including duct 48. Oil for clutch D1 enters through passage 47 and suitable ducts and grooves. Housing members 9, 40 and 41 support the structure and forms a suitable oil inclosure.

OPERATION FIG. 1

In neutral all clutches and brake bands are released and the gears may idle slowly under the influence of clutch drag.

In low speed, clutch D1 and brake band 35 are engaged. Sun gear 30 is driven by clutch D1, ring gear 27 is the reaction member and output shaft 33 is driven forward at reduced speed.

In second speed, brake band 36 is engaged, clutch D1 is released and clutch C1 engaged which drives ring gear 22 forward at input shaft speed. Sun gear 26 is the reaction member of the gear train and carrier 23 and output shaft 33 are driven forward at a speed intermediate to low and high speed. The vehicle can now free wheel but this can be stopped by engaging brake band 35. A smooth pick up shift from second to high speed and vice versa is obtained because although brake band 36 remains engaged, free wheeler 38 can release the second speed reaction member as soon as high speed is engaged.

In high speed clutches C1 and D1 are engaged and brake band 35 is released but brake band 36 remains engaged and holds the transmission in second speed until direct drive is engaged at which time free wheeler 38 releases sun gear 26 automatically.

In reverse clutch D1 and brake band 15 are engaged. Both sets of gears are then working with ring gear 22 as the reaction member and output shaft 33 rotates backward at reduced speed.

In the following gear ratio chart, r and s are symbols for ring gear 22 and sun gear 26 respectively and R and S are symbols for ring gear 27 and sun gear 30.

$$\text{Low gear ratio} = \frac{R+S}{S}$$

$$\text{2nd gear ratio} = \frac{r+s}{r}$$

$$\text{Rev. gear shift} = \frac{R+S}{S} - \left(\frac{r+s}{s} \times \frac{R}{S}\right)$$

DESCRIPTION FIG. 2

Figure 2:
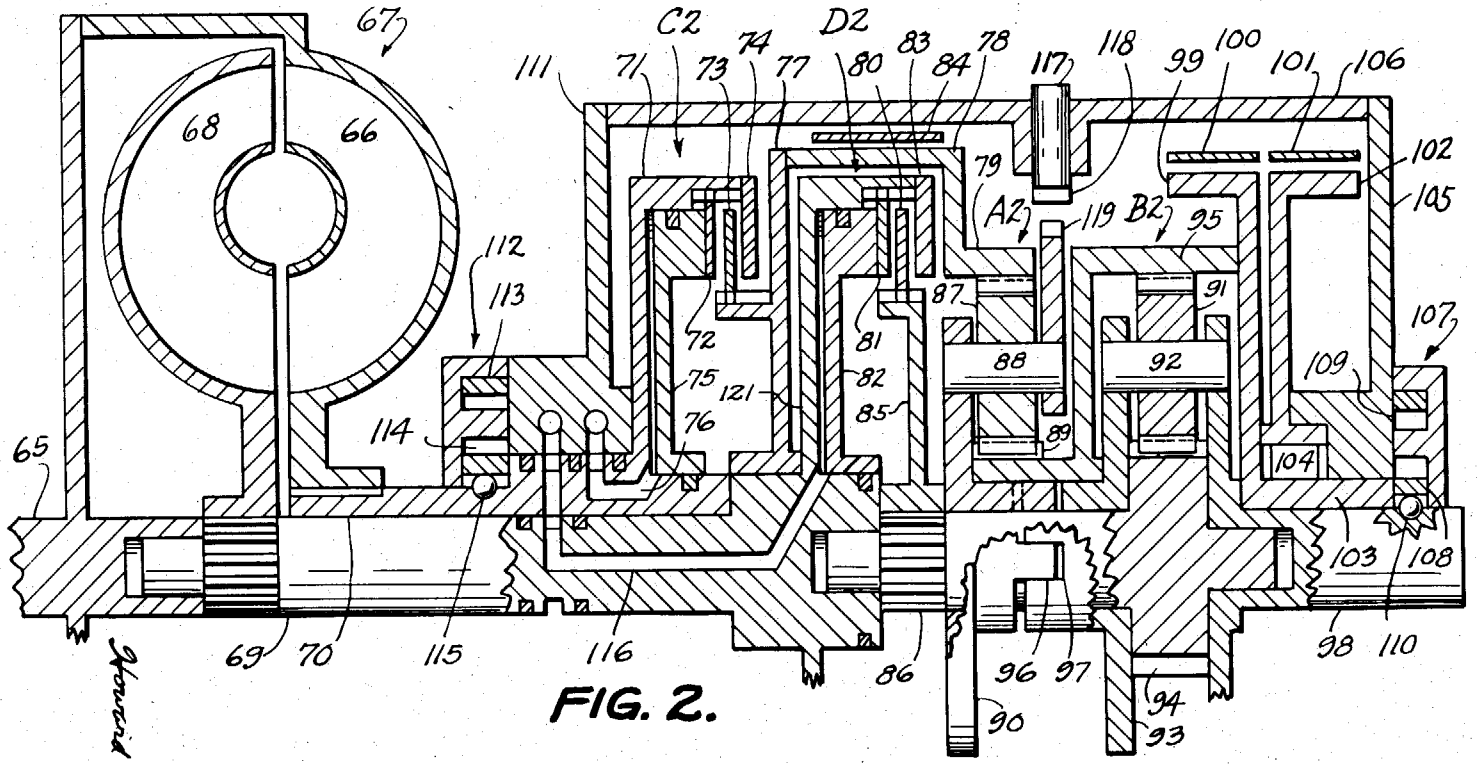
Fig. 2 shows a fluid coupling combined with the planetary gears in such a way that it can be wholly or partially locked up.

In Fig. 2 engine shaft 65 drives pump 66 of fluid coupling 67. Turbine 68 is splined to input shaft 69 which is integral with clutch housing 121. Pump 66 drives hub 70 of clutch housing 71 which is associated with piston 75, discs 72 and 73 and pressure plate 74 and comprise clutch C2. Clutch D2 comprises housing 121, piston 82, discs 80 and 81 and pressure plate 83, and drives drum 85 which is splined to intermediate shaft 86. Drum 78 is integral with ring gear 79 and is attached to flange 77 which is journaled on input shaft 69.

Gear set A2 consists of ring gear 79, sun gear 89 and planet gears 87, one of which is shown journaled on pin 88 fixed in carrier 90 and flange 119. Carrier 90 is connected to carrier 93 by tongue 96 and groove 97 and flange 119 has teeth at its outer diameter which are engageable with teeth 118 in parking lock detent 117. Gear set B2 includes ring gear 95, sun gear 94 and planet gears 91, one of which is shown journaled on pin 92. Carriers 90 and 93 are attached to output shaft 98.

Clutch C2 connects the input shaft 69 to ring gear 79 and clutch D2 connects the input shaft 69 to intermediate shaft 86 which is integral with sun gear 94, and is piloted in input shaft 69 and output shaft 98. Brake band 84 is engageable with drum 78 to hold ring gear 79 stationary for reverse drive and brake bands 100 and 101 engage drums 99 and 102 respectively, to hold ring gear 95 and sun gear 89 both stationary. When brake band 101 only is engaged free wheeler 104 permits only forward rotation of drum 99, ring gear 95 and sun gear 89. Input pump 112 comprises gears 113 and 114 and are driven by key 115.

Clutch C2 is engaged by pressure through duct 76 and clutch D2 is engaged by pressure through duct 116. Housing member 105 supports hub 103 of brake drum 99 and housing member 111 supports hub 70 of drum 71. Main housing 106 forms a suitable enclosure. Output shaft pump 107 includes gear 108 driven from output shaft 98 by key 110, and gear 109.

OPERATION FIG. 2

In neutral all clutches and brakes are released and the gears and intermediate shaft 86 may idle slowly if the net forward drag torque at the clutches C2 and D2 exceeds the frictional torque of the gear teeth. In low speed, clutch D2 and brake band 100 are engaged. Sun gear 94 is driven forward and ring gear 95 is the reactor and carrier 93 and output shaft 98 are driven forward at reduced speed.

In second gear brake band 101 and clutch C2 are engaged and clutch D2 is released which drives ring gear 79 at input speed. Sun gear 89 is the reactor and carrier 90 and output shaft 98 are driven forward at a reduced speed. Free-wheeling of the vehicle is prevented by engaging brake band 100.

In high speed brake band 101 remains engaged but brake band 100 is released and clutches C2 and D2 are engaged. As soon as the clutches are engaged sufficiently to drive gear set B2 and brake drum 99 forward, free wheeler 104 releases.

In reverse clutch C2 and brake band 84 engage. Ring gear 79 is the reactor and sun gear 94 the input member. This drives carriers 90 and 93 and output shaft 98 backward.

The following chart shows the friction control members engaged in the various speeds.

| | Fig. 1 | | | | Fig. 2 | | | |
|---|---|---|---|---|---|---|---|---|
| | Clutches | | Brakes | | Clutches | | Brakes | |
| Low | | D1 | 35 | | | D2 | 100 | |
| 2nd | C1 | | 35 | 36 | C2 | | 100 | 101 |
| High | C1 | D1 | | 36 | C2 | D2 | | 101 |
| Rev | | D1 | 15 | | | D2 | 84 | |

Having now described and illustrated one form of my invention, I wish it to be understood that my invention is not to be limited to the specific form or arrangement of parts herein described and shown or specifically covered by the following claims. For instance, although I refer to the planetary gear sets as first and second gear sets, their positions can be interchanged so as to have the second gear set adjacent to the input shaft instead of the first gear set. Such a structure would function the same as those shown and described.

I claim:

[1. In a variable speed transmission comprising power input and output shafts, first and second planetary gear sets, each set comprising a ring gear, a sun gear, a planet gear carrier and at least one planet gear, the sun gear of the first set being connected to the ring gear of the second set, both planet carriers being connected to the output shaft, a first clutch means for connecting the input shaft to a member of the first gear set, a second clutch means for connecting the input shaft to a member of the second gear set whereby, when both clutch means are engaged, a direct drive is obtained in the transmission.]

2. In a variable speed transmission comprising power input and output shafts, first and second planetary gear sets, each set comprising a ring gear, a sun gear, a planet gear carrier and at least one planet gear *meshing with said ring and sun gears*, the sun gear of the first set being *permanently* connected to the ring gear of the second set, both planet carriers being connected to the output shaft, *first* clutch means connecting said input shaft to the ring gear of the first gear set, *second* clutch means connecting said input shaft to the sun gear of the second gear set whereby, when both [clutches] *clutch means* are engaged, a direct drive is obtained through the transmission.

3. The combination set forth in claim [1] 2 and brake means for holding the ring gear of the first gear set whereby when the brake and said second clutch means are engaged a reverse reduction ration is obtained in the transmission.

4. The combination described in claim [1] 2 and brake means for holding the ring gear of the second gear set and the sun gear of the first gear set whereby when said second clutch means and the brake means are engaged, a low speed reduction is obtained and whereby when first clutch means and said brake means are engaged, a second speed reduction is obtained, and brake means for holding the ring gear of the first gear set whereby when said second clutch means and last mentioned brake means are engaged a reverse reduction is obtained in the transmission.

5. In a variable speed transmission comprising power input and output shafts, first and second planetary gear sets, each set comprising a ring gear, a sun gear, a planet gear carrier and at least one planet gear *meshing with said ring and sun gears,* the sun gear of the first set being *permanently* connected to the ring gear of the second set, both planet carriers being connected to the output shaft, first clutch means connecting the ring gear of the first gear set to the input shaft, second clutch means connecting the sun gear of the second gear set to the input shaft, brake means, and a one-way clutch connecting said brake means to the ring gear of the second gear set and the sun gear of the first gear set whereby, when the first clutch means and the brake means are engaged the sun gear of the first gear set is held against backward rotation and a second speed reduction is obtained, and when the second clutch means and the brake means are engaged the ring gear of the second gear set is held against backward rotation and a low speed is obtained in the transmission.

6. The combination described in claim 5 whereby when all of the said clutch means are engaged and said brake means is released, a direct drive is obtained in the transmission.

7. In a variable speed power transmitting system between an engine shaft and an output shaft, first and second planetary gear sets each having a ring gear, a sun gear, and a cage carrying at least one planet gear *meshing with said ring and sun gears,* the sun gear of one planetary set and the ring gear of the other set being *permanently* connected together, an element of each planetary set being connected to the output shaft, a pair of selectively engageable clutches for effecting first and second forward reduction speed drives, a first clutch of said pair of clutches for transmitting torque from the engine shaft to the sun gear of *said other* [the second] gear set and a brake for holding the first mentioned connected elements, whereby when the clutch and brake are engaged a low or first speed ratio is obtained at the output shaft, and the second clutch of said pair of clutches for transmitting torque from the engine shaft to the ring gear of *said one* [the first] gear set, whereby when the brake and the last mentioned clutch are engaged an intermediate or second speed ratio is obtained at the output shaft, and whereby when both of said clutches are engaged and the brake is released, a direct drive through the transmitting system is obtained.

8. In a variable speed power transmitting system between an engine shaft and an output shaft, first and second planetary gear sets each having a ring gear, a sun gear, and a planet gear cage carrying at least one planet gear *meshing with said ring and sun gears,* the sun gear of the first planetary set being *permanently* connected to the ring gear of the second set, both planet gear cages being connected to the output shaft, a pair of selectively engageable clutches for effecting first and second forward reduction speed drives a first clutch of said pair of clutches for transmitting torque from the engine shaft to the sun gear of the second planetary set and a brake for holding said connected sun gear and ring gear whereby, when the clutch and brake are engaged, a low or first speed ratio at the output shaft is obtained, and the second clutch of said pair of clutches for transmitting torque from the engine shaft to the ring gear of the first planetary set whereby, when the brake and the last mentioned clutch are engaged, an intermediate or second speed ratio is obtained at the output shaft, and whereby, when both of said clutches are engaged and the brake is released, a direct drive through the transmitting system is obtained.

9. The combination set forth in claim 7 and a hydrodynamic vaned wheel device between the engine shaft and said planetary gear sets.

10. The combination set forth in claim 7 and a hydrodynamic device connecting the engine shaft to the first mentioned clutch.

11. The combination set forth in claim 8 and a hydrodynamic device connecting the engine shaft to the first mentioned clutch.

12. The combination set forth in claim 7 and a brake for holding the ring gear of the first set whereby, when the last mentioned brake and the first mentioned clutch are engaged, a reverse speed ratio is obtained.

13. The combination set forth in claim 8 and a brake for holding the ring gear of the first set whereby, when the last mentioned brake and the first mentioned clutch are engaged, a reverse speed ratio is obtained.

14. In a multi-speed drive, a power shaft, a load shaft, first and second planetary gear sets, each set comprising sun, ring and planet gears and a planet gear carrier, *said planet gears meshing with said sun and ring gears,* a driving connection between [an element of each] *the ring gear of the second gear set and sun gear of the first* gear set, a driving connection between the load shaft and the carrier of each gear set, a clutch between the power shaft and the ring gear of the first set, a clutch between the power shaft and the sun gear of the second set, a brake for holding the first named connected elements, and a brake for holding the ring gear of the first gear set.

15. The combination set forth in claim 14 and a brake drum, a one-way clutch between said first named connected elements and said brake drum, and a brake band for holding last named brake drum.

*16. A variable speed transmission comprising first and second planetary gear sets, each set comprising a ring gear, a sun gear, a planet gear carrier, and planet gears meshing with said sun and ring gears, an output shaft, a driving connection between both carriers and said output shaft, a first selectively engageable reaction brake and a one-way clutch adapted to hold both the sun gear of the first set and ring gear of the second set against backward rotation and to permit forward rotation thereof, an input torque shaft connected to the sun gear of the second set for transmitting input torque thereto, means connected to the ring gear of the first set for transmitting input torque thereto, a rearward driving connection between the ring gear of the second set and sun gear of the first set, and a second selectively engageable reaction brake to hold the ring gear of the first set, whereby when said first brake is engaged and said second brake is released free wheeling low and intermediate speed forward reduction drive of the carriers and output shaft may be established through the sun gear of the second set and ring gear of the first set respectively, with the other ring and sun gears serving as reaction members, and whereby when said second brake is engaged and said first brake is released a reverse reduction drive of the carriers and output shaft may be established through the sun, planet and ring gears of the second set and the sun and planet gears of the first set with the ring gear of the first set serving as a reaction member.*

*17. The combination set forth in claim 16 and a third selectively engageable brake adapted to hold the ring gear* of the second set against forward rotation whereby a non-free wheeling forward reduction may be established.

18. In a multi-speed drive, a load shaft, first and second planetary gear sets, each set comprising sun, ring and planet gears and a planet gear carrier, said planet gears meshing with said sun and ring gears, a driving connection between the ring gear of the second gear set and sun gear of the first gear set, a driving connection between the load shaft and the carrier of each gear set, means connected to the ring gear of the first set for transmitting input torque thereto, means connected to the sun gear of the second set for transmitting input torque thereto, a brake for holding the ring gear of the second set, and a brake for holding the ring gear of the first gear set.

19. The combination set forth in claim 18 and a brake drum, a one-way clutch between said first named connected elements and said brake drum, and a brake band for holding said last named brake drum.

20. A variable speed transmission comprising first and second planetary gear sets, each set comprising a ring gear, a sun gear, a planet gear carrier, and planet gears meshing with said sun and ring gears, an output shaft, a driving connection between both carriers and said output shaft, a first selectively engageable reaction brake, connecting means adapting said brake when engaged to hold both the sun gear of the first set and ring gear of the second set against backward rotation, means connected to the sun gear of the second set for transmitting input torque thereto, means connected to the ring gear of the first set for transmitting input torque thereto, a rearward driving connection between the ring gear of the second set and sun gear of the first set, and a second selectively engageable reaction brake adapted to hold the ring gear of the first set, whereby when said first brake is engaged and said second brake is released low and intermediate speed forward reduction drive of the carriers and output shaft may be established through the sun gear of the second set and ring gear of the first set respectively, with the other ring and sun gears serving as reaction members, and whereby when said second brake is engaged and said first brake is released a reverse reduction drive of the carriers and output shaft may be established through the sun, planet and ring gears of the second set and the sun and planet gears of the first set with the ring gear of the first set serving as a reaction member.

21. A variable speed transmission comprising first and second planetary gear sets, each set comprising a ring gear, a sun gear, a planet gear carrier, and planet gears meshing with said sun and ring gears, an output shaft, a driving connection between both carriers and said output shaft, a first selectively engageable reaction brake, connecting means adapting said brake when engaged to hold both the sun gear of the first set and ring gear of the second set, means connected to the sun gear of the second set for transmitting input torque thereto, means connected to the ring gear of the first set for transmitting input torque thereto, a rearward driving connection between the ring gear of the second set and sun gear of the first set, and a second selectively engageable reaction brake adapted to hold the ring gear of the first set, whereby when said first brake is engaged and said second brake is released low and intermediate speed forward reduction drive of the carriers and output shaft may be established through the sun gear of the second set and ring gear of the first set respectively, with the other ring and sun gears serving as reaction members, and whereby when said second brake is engaged and said first brake is released a reverse reduction drive of the carriers and output shaft may be established through the sun, planet and ring gears of the second set and the sun and planet gears of the first set with the ring gear of the first set serving as a reaction member.

22. A variable speed transmission comprising first and second planetary gear sets, each set comprising a ring gear, a sun gear, a planet gear carrier, and planet gears meshing with said sun and ring gears, an output shaft, a driving connection between both carriers and said output shaft, a first selectively engageable reaction brake, connecting means adapting said brake when engaged to hold both the sun gear of the first set and ring gear of the second set against backward rotation, said connecting means including a one-way clutch permitting both said last named sun and ring gears to rotate forwardly, means connected to the sun gear of the second set for transmitting input torque thereto, means connected to the ring gear of the first set, a rearward driving connection between the ring gear of the second set for transmitting input torque thereto and sun gear of the first set, and a second selectively engageable reaction brake adapted to hold the ring gear of the first set, whereby when said first brake is engaged and said second brake is released free wheeling low and intermediate speed forward reduction drive of the carriers and output shaft may be established through the sun gear of the second set and ring gear of the first set respectively, with the other ring and sun gears serving as reaction members, and whereby when said second brake is engaged and said first brake is released a reverse reduction drive of the carriers and output shaft may be established through the sun, planet and ring gears of the second set and the sun and planet gears of the first set with the ring gear of the first set serving as a reaction member.

23. A variable speed transmission comprising first and second planetary gear sets, each set comprising a ring gear, a sun gear, a planet gear carrier, and planet gears meshing with said sun and ring gears, an output shaft, a driving connection between both carriers and said output shaft, a first selectively engageable reaction brake, connecting means adapting said brake when engaged to hold both the sun gear of the first set and ring gear of the second set against backward rotation, said connecting means including a one-way clutch permitting both said last named sun and ring gears to rotate forwardly, a second selectively engageable reaction brake adapted to hold the ring gear of the second set against forward rotation, means connected to the sun gear of the second set for transmitting input torque thereto, means connected to the ring gear of the first set for transmitting input torque thereto, a rearward driving connection between the ring gear of the second set and sun gear of the first set, and a third selectively engageable reaction brake adapted to hold the ring gear of the first set, whereby when said first brake only is engaged free wheeling low and intermediate speed forward reduction drive of the carriers and output shaft may be established through the sun gear of the second set and ring gear of the first set respectively, with the other ring and sun gears serving as reaction members, whereby when said second brake is engaged a two-way forward reduction drive may be established, and whereby when said third brake only is engaged a reverse reduction drive of the carriers and output shaft may be established through the sun, planet and ring gears of the second set and the sun and planet gears of the first set with the ring gear of the first set serving as a reaction member.

References Cited in the file of this patent or the original patent

UNITED STATES PATENTS

| | | |
|---|---|---|
| 856,703 | Iversen | June 11, 1907 |
| 2,350,810 | Pentz | June 6, 1944 |
| 2,593,568 | Kelbel | Apr. 22, 1952 |
| 2,640,373 | Jandasek | June 2, 1953 |
| 2,645,135 | Frank | July 14, 1953 |
| 2,695,533 | Pollard | Nov. 30, 1954 |
| 2,803,974 | Kelley | Aug. 27, 1957 |